United States Patent [19]

Macriss et al.

[11] 4,134,743

[45] *Jan. 16, 1979

[54] DESICCANT APPARATUS AND METHOD

[75] Inventors: Robert A. Macriss, Deerfield; William F. Rush, Arlington Heights; Sanford A. Weil, Chicago, all of Ill.

[73] Assignee: Gas Developments Corporation, Chicago, Ill.

[*] Notice: The portion of the term of this patent subsequent to Oct. 29, 1991, has been disclaimed.

[21] Appl. No.: 518,783

[22] Filed: Oct. 29, 1974

Related U.S. Application Data

[63] Continuation-in-part of Ser. No. 314,400, Dec. 2, 1972, Pat. No. 3,844,737, which is a continuation-in-part of Ser. No. 24,373, Mar. 31, 1970, abandoned.

[51] Int. Cl.$^2$ .............................................. B01D 53/06
[52] U.S. Cl. .......................................... 55/34; 55/75; 55/390
[58] Field of Search ..................................... 55/31–35, 55/75, 316, 388–390; 62/94, 271

[56] References Cited

U.S. PATENT DOCUMENTS

| | | | |
|---|---|---|---|
| 3,009,540 | 11/1961 | Munters | 55/34 |
| 3,024,867 | 3/1962 | Milton | 55/389 |
| 3,144,901 | 8/1964 | Meek | 55/390 |
| 3,176,466 | 4/1965 | Siggelin | 55/388 |
| 3,266,973 | 8/1966 | Crowley | 55/75 |
| 3,464,186 | 9/1969 | Hankison et al. | 55/316 |
| 3,555,787 | 1/1971 | Luskis | 55/389 |
| 3,664,095 | 5/1972 | Asker et al. | 55/387 |
| 3,807,149 | 4/1974 | Norback | 55/389 |
| 3,844,737 | 10/1974 | Macriss et al. | 55/390 |

*Primary Examiner*—Bernard Nozick
*Attorney, Agent, or Firm*—Thomas W. Speckman

[57] ABSTRACT

A process and apparatus for drying air by a continuous atmospheric pressure and low pressure drop system wherein the adsorbent body is a wheel of thin sheets or layers of fibrous material containing about 10 to 90% by weight of a finely divided crystalline molecular sieve material. The process and apparatus is especially useful for drying air for confined areas down to and less than 0.001 lbs. of moisture per pound of air.

9 Claims, 2 Drawing Figures

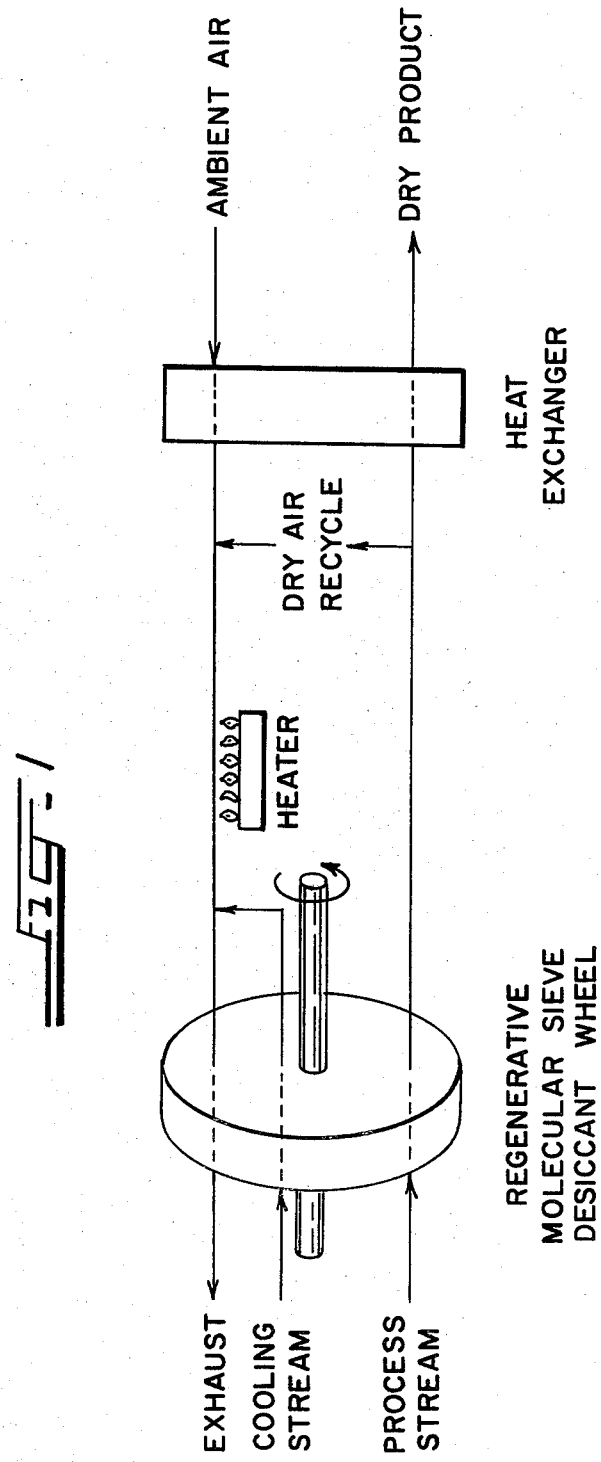

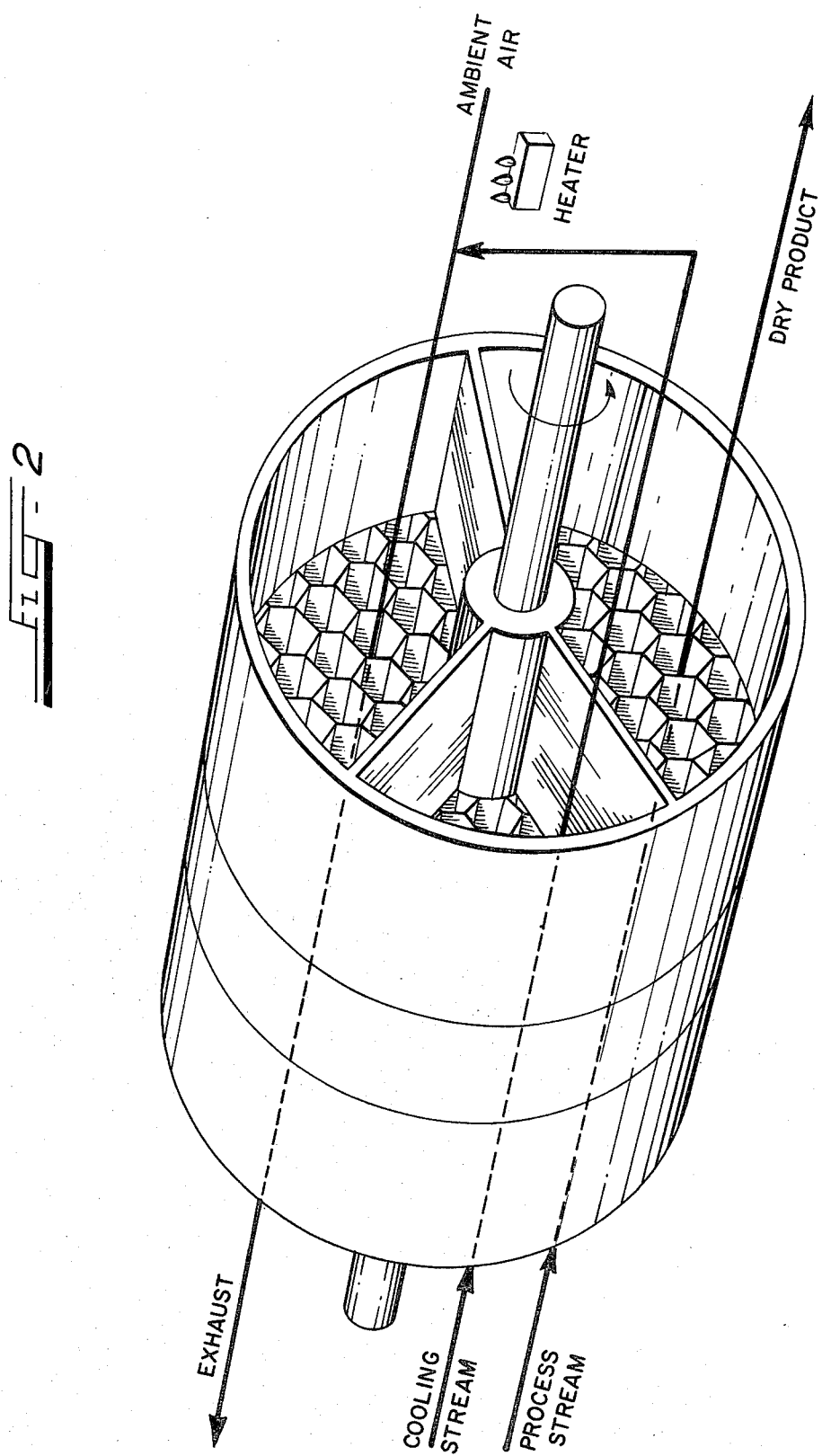

DESICCANT APPARATUS AND METHOD

CROSS REFERENCE TO RELATED APPLICATIONS

This application is a continuation-in-part of our co-pending application Ser. No. 314,400 filed Dec. 2, 1972 now U.S. Pat. No. 3,844,737 issued Oct. 29, 1974, which was a continuation-in-part of our earlier filed application Ser. No. 24,373 filed Mar. 31, 1970, now abandoned.

This invention relates in general to desiccant systems, and particularly to improved processes and apparatus for drying gases, including environmental air, with improved efficiency and depth of drying. Our earlier filed applications referred to above, disclose the use of thin sheets or layers of fibrous material having impregnated therein molecular sieves. These desiccant structures are taught in our prior applications to be useful in the L-wheel of open cycle air conditioning processes and apparatus. Basically, open-cycle air conditioners operate by dehumidification and subsequent cooling of air wherein moist air is conditioned by a three-stage process to produce cool, relatively dry air. One such system is known as the Munters environmental control system (MEC) unit and is described in U.S. Pat. No. 2,926,502.

The principle involved in the cooling effect of the open cycle air conditioners is that dry, warm air can be simultaneously cooled and humidified by contacting it with water. In geographic areas where the air is both warm and humid, it must be dried before it can be cooled by evaporation. During the heating season of autumn, winter and spring, the unit can be used to warm and humidity cold, dry air by making minor changes in the unit's operating cycle.

The efficiency and effectiveness of an open-cycle air conditioning system depends largely on the ability of the unit to dehumidify the warm, moist input air. Although various means of dehumidification have been employed with open-cycle air conditioners, none has provided the high, effective dehumidification necessary for efficient operation on air of exceptionally high temperature and humidity, while at the same time providing adequate kinetics and rapid regeneration leading to a high coefficient of performance.

A typical prior art type of L-wheel construction is shown in the U.S. patent to Pennington, No. 2,700,537. There, the L-wheel is shown typically as a rotatable cylindrical means made of asbestos paper or other absorbent fire-resistant material which is impregnated with a liquid hygroscopic substance capable of sorbtion of moisture from air passing thereover. Moisture in the incoming air is sorbed by the hygroscopic material impregnated in the L-wheel, with the latent heat of condensation being taken up by the air, thus resulting in an air temperature increase. The incoming air therefore is heated and dehumidified by the L-wheel, and the resultant heated and relatively dry air is then passed through a rotating S-wheel which is relatively cool and which functions to cool the air with no change in moisture content. The incoming air is humidified while the latent heat of vaporization is simultaneously extracted, thereby cooling the air. The resulting air is passed into the room at a lower dry bulb temperature than the outside air with about 95% relative humidity.

Conventional desiccants used with L-wheels are salts, such as lithium chloride used as the drying agent impregnated into the wheel material. However, LiCl does not have a deep drying capability for water absorbing capacity required in humid climates. Although lithium bromide has been tried in such cases to improve the capacity of the conventional equipment, it tends to decompose and release small amounts of bromine to the air, a disadvantage so serious that no practical LiBr impregnated wheels are in use.

Even more serious a disadvantage is the fact that prior art desiccants "weep". That is, under conditions of high percentage of moisture in the incoming air, such as moist air having a dry bulb temperature of 92° F. and a wet bulb temperature of 80° F., the salts have a tendency to deliquesce and form aqueous solutions that drip from the wheel. These solutions then either flow out of the unit or are stripped by the flowing air. This condition thus leaches the wheel of its absorbent material rendering it useless. In addition, the aqueous solution tends to ruin the integrity of form of the wheel, causing channel collapse or plugging. In order to overcome this "weeping" problem, a very low practical limit in the amount of salt desiccant impregnated into the wheel is used. For example, this is on the order of a maximum of 11½% for LiCl and up to 25-27% for LiBr. As a result of this low amount of desiccant, the desiccant wheels of the prior art must be very large with a high surface area to have any appreciable capacity. For example, a low desiccant/support ratio, on the order of 0.1 for LiCl, necessitates uneconomically large wheels having great masses of asbestos for the desiccant support, which in turn imposes substantial power requirements for rotation, and heat requirements for regeneration. High LiCl concentrations as indicated eventually lead to desiccant deliquesence. For example, a wheel could be made with a high (over 12% LiCl content) that would initially dry the mentioned moist air to a low level of say 0.003 lbs. $H_2O$/lb. of air. However, the LiCl would soon weep and the wheel could no longer dry the air to this level. Further, a wheel with less than 12% — i.e. 10% LiCl will not weep but cannot economically dry air to a moisture level of 0.003 lb. $H_2O$/lb. air.

Another serious disadvantage of the prior art desiccants is the fact that their effectiveness of operation is temperature dependent. At lower temperatures the equilibrium vapor pressure for a given loading, in terms of lbs. $H_2O$/lb. desiccant, will be lower than at elevated temperatures. Thus, as the temperature rises the desiccant exhibits increasing equilibrium water vapor pressure. Since the air passing next to the desiccant cannot lose more water than this vapor pressure, the air is less deeply dried. This is termed high temperature loss.

This problem is aggravated by the fact that the desiccants are regenerated to a dry state by high temperatures in the regenerative half of the cycle, but the high temperatures carry over to the cooling half of the cycle by virtue of the heat capacity of the support and desiccant, thus causing high temperature loss.

In addition, prior art systems suffer from the disadvantage that the amount of heat energy required to regenerate the desiccant-adsorbent material is high, so that they have a poor coefficient of performance (COP) for the system.

Another problem with prior art systems using LiCl and LiBr desiccants is that the desiccant is chemically unstable and will deteriorate in the presence of products of combustion. Since the desiccants are used in an open-cycle air conditioning system which typically includes drying the wheel with air heated by mixing the combustion products of natural gas, this is a very serious problem. For example, in the case of a LiCl wheel, the LiCl can react with $SO_x(SO_2, SO_3)$ and $NO_x(NO_2, N_2O_3)$ present in a direct heated air stream to form salts such as $Li_2SO_4$, $LiNO_3$, both of which do not function as a desiccant material.

Finally, prior art desiccant materials suffer from the fact that they have very poor "kinetics". By the term kinetics, it is meant that during the continuous rotation, the wheel must perform the functions of absorbing water from the incoming moist air on the input half of the cycle and then be regenerated to the dry state on the output half of the cycle. This is conventionally done by heating the exhaust air to a very high temperature, resulting in a relatively low humidity. The very hot, relatively dry air in passing through the desiccant wheel on the exhaust portion of the cycle withdraws water from the moistened desiccant wheel material. However, the fact that the wheel is continuously in motion means that there is only a short residence time in the regenerative half of the cycle, and thus the impregnated moistureaccepting material of the desiccant wheel may not be sufficiently dried to function efficiently on the second and subsequent input half of the cycle.

Dryers similar to the above described desiccant wheel have been used in the past as exemplified by Canadian Pat. No. 615,214. However, such dryers have the same disadvantages as pointed out above, particularly the impossibility of utilizing an open flame for heating the regeneration stream and not providing desired capacity in a continuous system.

Molecular sieves have been known to be far superior in adsorption of moisture than the above mentioned adsorbents. Molecular sieves are well known to have excellent water adsorption capacity and are non-reactive to and additionally adsorb carbon dioxide, sulfur dioxide and nitrogen dioxide down to extraordinarily low levels. The use of the molecular sieves for such purposes is more fully described in several patents exemplified by U.S. Pat. No. 3,808,773. However, in the prior art processes and apparatus the molecular sieves have been utilized in packed beds. Many serious disadvantages of the packed beds utilizing molecular sieves are pointed out in the 3,808,773 patent. Particularly, packed beds have the disadvantage of usually high pressure drop requiring the expenditure of energy to overcome. To obtain a continuous operation, a series of packed beds is required to be cycled since the packed bed must be totally shutdown as far as processing is concerned, to achieve regeneration.

It is an object to provide an improved desiccant system for air drying.

It is another object to provide a substantially better desiccant system that does not weep at high humidity levels and which is characterized by high desiccant-/support ratios.

It is another object to provide a desiccant system that can effectively dry the ambient air much more deeply than the prior art desiccant systems.

It is another object of this invention to provide improved desiccant processes and apparatus resulting in smaller air moving equipment, lower power requirements to move the air, smaller overall machine size, and smaller desiccant carrier size as compared to prior art devices.

It is another object of this invention to provide a desiccant system that is not chemically reactive with the products of combustion including, for example, $NO_x$ and $SO_x$.

It is still another object of this invention to provide a desiccant system that has a greater thermal and chemical stability than systems of the prior art.

It is still a further object of this invention to provide a method of drying having improved kinetics and energy parameters as compared to the prior art.

It is still another object of this invention to provide a desiccant system which is operable at atmospheric pressures with low pressure drop being created by the system.

Still other and further objects of this invention will be evident from the description when taken with the drawing wherein:

FIG. 1 is a schematic representation of one embodiment of an apparatus for use in the process of this invention; and FIG. 2 is a schematic representation of one embodiment of a rotating desiccant wheel for use in the process and apparatus of this invention.

This invention involves the use of an improved desiccant system which comprises the use of thin sheets or layers of a fibrous material having impregnated therein from about 1 to 90% and preferably about 10 to 90% by weight of a solid desiccant comprising finely powdered, solid, crystalline alkali metal or alkaline earth metal alumino-silicates that have the water of hydration removed. Especially suitable is about 25 to 90% by weight of modular sieve material, about 40 to about 70% being especially preferred. The desiccant materials particularly useful are crystalline, natural or synthetic zeolites or molecular sieves, and these terms are used interchangeably throughout.

Typical of the fibrous material which may be used is cellulose paper, particularly for fairly low temperature operation at temperatures below about 250° F. Other "papers" which may be used at higher temperatures include papers manufactured of the following types of fibers: asbestos, fiberglass, "Teflon", "Kel-F", polyamides such as Nylon, polyesters such as Dacron, and mixtures of these fibers. In general, any type of material may be used which can be first formed into fibers, and thereafter by standard paper making processes into a mat of material containing therein and thereon the molecular sieve adsorbent material. This includes not only natural fibers such as cellulose or asbestos materials but also synthetics including plastics such as those mentioned above and other fiber-forming high molecular weight polymer materials. Generically, the Teflon and Kel-F materials are, respectively, polytetrafluoroethylene and poly-chlorotrifluoroethylene polymers. Some types of Kel-F polymers are also copolymers of vinylidene fluoride with chlorotrifluoroethylene.

The papers thus formed containing the solid desiccant impregnated during conventional papermanufacturing processes are then formed into moisture or heat transfer bodies, such as L-wheels, in a manner conventional to the art. Generally speaking, zeolites or molecular sieves are well understood to be a type of alkali metal or alkaline earth metal alumino-silicate, and we can use any synthetic or natural type material in the process of our invention. Typically useful are the commercially available molecular sieve materials, such as those designated as type A-3, A-4, A-5 and 13-X. The desiccant powders are readily incorporated into the paper during the manufacture thereof by forming a slurry or the paper fibers and the powder in water and depositing the slurry on a screen, which in continuous processes is moving, followed by the conventional steps of water removal transfer of the paper to drying means, and collecting the paper in rolls or other convenient forms. Thereafter, the paper can be processed in a form useful for construction of the L-wheel, as, for example, the formation of a corrugated paper having a thickness and a periodicity within the range of from about 1/16 to ¼ inch. A suitable size is a thickness of ⅛ and periodicity of ⅛ inch. Thereafter, the corrugated paper is cut into strips and wrapped around the axle of the L-wheel in a spiral fashion to the desired L-wheel diameter. Alternatively the desiccant-bearing support material may be shaped in a honeycomb form or expanded into shape, as shown in FIG. 2. By the term expanded, we mean the formation of regular or irregular honeycomb shapes by stripfluing together layers of the desiccant-bearing paper, in alternating positions for successive layers, followed by lateral opening or expanding the laminate to form the honeycomb apertures between adjacent sheets. The expanded form permits a reduction in the pressure drop in the system, simplification of manufacture and reduction in cost.

FIG. 1 schematically shows the apparatus and process of our invention. The regenerative molecular sieve desiccant wheel is shown to be rotating counterclockwise, as viewed.

The process stream or stream to be treated may come from any closed source such as a home, commercial or industrial building, an area requiring dryness for equipment or scientific apparatus or areas requiring dryness to preserve goods such as ships' holds. The process stream is passed through the regenerative molecular sieve desiccant wheel for drying. The desired extent of drying will be governed by the use requirements of the dry product air and may be controlled by the rate of flow of the process stream together with the volume of the regenerative molecular sieve desiccant wheel through which the process stream passes. The volume of the wheel through which the process stream passes is governed by the design features of the thickness of the wheel and the arcuate angle of the wheel exposed to the process stream as a result of the rate of rotation. The dry air exits from the desiccant wheel and it is usually desirably cooled by passage through a heat exchanger which warms the ambient air regeneration stream.

The ambient air regeneration stream is heated by heat exchange with the dry product air and further heated by the heater located between the heat exchanger and the desiccant wheel. One advantage of the desiccant wheel of this invention is that the heater may be an open gas flame for high heating efficiency. The heater may also be any other heat source such as electric, heat exchanger provided with hot liquid or gas from any available source. The regeneration stream passes through the desiccant wheel countercurrent to the process stream at a temperature and rate sufficient to remove and exhaust the moisture from the molecular sieves. Again, the rate of flow, thickness of the wheel, arcuate area of the wheel exposed to the regeneration stream and rate of rotation of the wheel are all design features which must be considered to achieve the desired regeneration at the rate governed by the other portions of the process. It is desired that the regeneration stream be at temperatures above about 180° F. and preferably above about 300° F. The upper limit is governed by the necessity to cool the molecular sieves prior to introduction of the process stream.

After the main regeneration stream it is desirable to cool the desiccant wheel for higher efficiency of water adsorption. The cooling stream may come from the ambient air or may come from the process stream which may be derived from the enclosed volume into which the dry product is introduced.

We have found the regenerative molecular sieve desiccant wheel as shown in FIG. 1 very effectively removes moisture down to 0.001 lbs. of water per pound of air in the dry product stream without recycle of dry product air in the regeneration stream. When it is desired that the dry product stream have a lower concentration of moisture than 0.001 lb/lb, it is necessary to recycle a portion of the dry air product to the regeneration stream as shown in FIG. 1 so that the desiccant wheel may be more effectively regenerated. In such cases, it is sometimes desirable that the cooling stream be derived from the dry product air, also.

Typical outdoor conditions in which the desiccant systems of this invention may operate include a wet bulb temperature greater than 75° F. and a dry bulb temperature greater than 80° F. such as air with a 92° F. dry bulb temperature and an 80° F. wet bulb temperature as found in the outdoor conditions of Miami, Fla. Produced is air with a moisture content of less than 0.003 lbs. $H_2O$/lb air. The desiccant system of this invention is particularly suitable for air having a dry bulb temperature in the range of 80° F.–120° F. and a wet bulb temperature in the range of 75° F.–90° F. wherein the air has an absolute humidity level of about 0.017 to about 0.022 lbs $H_2O$/lb air. In contrast, conventional LiCl desiccant systems cannot economically produce dried air close to the 0.003 lbs $H_2O$/lb air value when operating with humid air in this range. In addition, the molecular sieves on desiccant wheels are not sensitive to products of combustion such as $NO_x$ and $SO_x$ commonly found in the hot gases. In contrast, LiCl reacts with $NO_x$ and $SO_x$ to render the desiccant inactive for air drying.

The desiccants used in this invention may include natural crystalline zeolites, such as stilbite, or synthetically produced crystalline metal alumino-silicates known as molecular sieves, activated for adsorption by removing their water of hydration. Molecular sieves belong to the class of compounds known as zeolites, but this latter term is also inclusive of both gel-type amorphous alumino-silicates commonly referred to as zeolites (used as water softeners), and of the crystalline zeolites used in this invention. The amorphous type do not exhibit selectivity based on molecular size.

The unit cell of the crystalline zeolites of this invention have a unit cell formula of $M_{2/n}O \cdot Al_2O_3 \cdot x\ SiO_2 \cdot y\ H_2O$ where M is a cation of n valence. The fundamental group in each unit cell, the smallest repetitive entity in the crystalline material, is a tetrahedra of four oxygen anions surrounding a silicon or alumina cation with the metal cation making up the positive charge deficit in each alumina tetrahedra. Among the over forty commercial zeolites available, we prefer the 3-A, 4-A, 5-A, 10-X and 13-X types. The 4-A type has a unit cell formula of $Na_{12}[(AlO_2)_{12}(SiO_2)_{12}] \cdot 27\ H_2O$, in which two alumina and two silica tetrahedra link to form a rigid compact group. The latter links with other identical groups to form a cubic cell having a ring aperture on each face, the diameter of this aperture being 4 A, hence the designation 4-Å. The central adsorption cavity of the cube has a volume of about 925 $Å^3$, which is occupied by the water of hydration which can be driven off by heat. The water enters and leaves through the aperture. About $10^9$ unit cells comprise a cubic crystal in the powder form which measures about $1\mu$ along an edge, but which may be as large as $2\mu$, and can agglomerate with others to form a particle of size about $10\mu$ in size. Some penetration twinning type crystals range up to $30$–$40\mu$ in size.

Of the 12 Na cations in type 4-A, six are located at the pore openings partially blocking them and the remainder are located on the interior of the cube. Any or all of these Na cations can be exchanged with other metal cations, for example by potassium to give an aperture of 3 Å, hence the designation of 3-A for this type. Type 5-A is formed by exchanging the 12 Na cations with an equivalent of calcium cations, six in number, which locate on the inner face of each cell leaving the apertures unrestricted, of size 4.2 Å. Type 13-X has the unit cell formula $Na_{86}[(AlO_2)_{86}(SiO_2)106]$. 276 $H_2O$, while the 10-X type has an effective ring diameter of about 8 Å. All these types have bulk density of about 30 lbs./cu.ft. for powders in the 1–$10\mu$ size range.

The A type molecular sieve, as well as having a cental cavity termed the cage, also has a second set of cavities or B cages formed by the truncated octahedra unit cells joined in cubic array which, although smaller can accept water molecules in the hydration-dehydration cycle of our invention.

Also suitable are Zeolon molecular sieves available from Norton Company. Particularly suitable are the Zeolon series 100, 200, 500 and 900. They are available in sodium form and hydrogen exchanged form and have the composition $M_{8/n} \cdot Al_8 \cdot Si_{40} \cdot O_{96} \cdot 24H_2O$ where M is an exchangeable cation having valence n. These types have bulk densities about 40.

By way of example, an asbestos fiber paper was prepared by forming a slurry of the asbestos fiber with a molecular sieve, type 4-A, which is a finely powdered sodium alumino-silicate of unit crystalline cell of empirical formula $Na_{12}(AlO_2)_{12} \cdot 27$ $H_2O$ (hydrated form) of size 1–$10\mu$. For test purposes, a sheet was formed containing 25% by weight of the molecular sieve impregnated into and on the asbestos fiber. At test conditions of average temperature of 194° F. (90° C.), with regeneration at the same temperature, and air moisture content of 0.019 lb. $H_2O$/lb. air, one lb. of the desiccant-bearing asbestos system of this invention can remove 0.083 lbs. $H_2O$ per pound of wheel to a dry air level of 0.0012 lb. $H_2O$/lb. air.

For comparison, a standard asbestos sheet of paper was prepared in the same manner without the molecular sieve material in the water-fiber slurry. Thereafter, the asbestos was impregnated with 12% by weight lithium chloride adsorbent. This amount of impregnation of lithium chloride is about the maximum permissible without having weeping. Under the same test conditions as above (194° F.) each pound of the LiCl-asbestos system can remove only 0.018 lb. of water per pound of wheel from ambient air having the same moisture content (0.019 lb. $H_2O$/lb. air) resulting in a dry air level of only about 0.003 lbs. $H_2O$/lb. air. Lower levels are not practical.

The comparison shows over a four-fold increase in the drying capacity (0.083/0.018) for only a little over a doubling of the desiccant/support ratio for the system according to this invention. In addition, the high desiccant/support fractions of up to about 0.9 as compared to 0.1 for LiCl is a significant improvement.

The vapor pressure of the two desiccant wheel materials, asbestos having impregnated therein 45% molecular sieve material according to the present invention, and asbestos having impregnated therein 11% lithium chloride according to the prior art, were tested at 90° C. with the results shown in Table 1.

Table 1 below shows that the molecular sieve bearing paper of this invention absorbs more water per lb. of total system seen by the increased loading capable with molecular sieves compared to LiCl for a given vapor pressure. Conversely, at a given loading value the equilibrium vapor pressure above the molecular sieve material of this invention is lower than with LiCl, thus resulting in deeper drying.

TABLE 1

Vapor Pressure-Loading Characteristics of Desiccant Wheel Molecular Sieve Supported on Asbestos

| LiCl on Asbestos at 9° C. | | Crystalline Zeolite on Asbestos at 90° C. | |
|---|---|---|---|
| lbs.$H_2O$/lb. system | Equilibrium Vapor Pressure m m Hg | lbs.$H_2O$/lb. system | Equilibrium Vapor Pressure m m Hg |
| .005 | 56 | .005 | 5 |
| .01 | 118 | .01 | 15 |
| .015 | 175 | .015 | 31 |
| .02 | 234 | .02 | 57 |
| .025 | 282 | .025 | 88 |
| .03 | 350 | .03 | 125 |

In addition, the amount of molecular sieve which can be incorporated into the fibrous material according to this invention is substantially greater than the lithium chloride or lithium bromide of the prior art. Whereas a maximum concentration for lithium chloride is on the order of 11 or 12%, and up to 27% by weight may be obtainable for a lithium bromide material, we have found that the molecular sieves of our invention may be incorporated in an amount of from about 1 to 90%, preferably about 10 to about 90% and most preferably 40 to 60%. We have found extremely good properties with an amount of molecular sieve on the order of 45% impregnated into the fibrous material.

A typical desiccant wheel according to this invention may be constructed of a corrugated fiberglass paper having incorporated therein from 25 to 45% of molecular sieve, preferably a 3-A, 4-A, 5-A or 13-X type, the corrugations having a thickness on the order of ⅛ inch and a periodicity of on the order of 3/16 inch, with the wheel having a total diameter of on the order of 12 inches. The wheel rotates at a speed of from three to four minutes per revolution with the air velocity on the order of 200 feet per minute/passing therethrough at a temperature on the inside of the desiccant wheel, that side adjacent to the heating section, on the order of 325° F.–500° F. The depth or thickness of the wheel is somewhat dependent upon the climatic region and in a middle western region would have a depth on the order of 6 inches. For more moist climates, the thickness of the wheel can be increased whereas for less moist climates the thickness would be decreased. In contrast, a desiccant wheel employing the practical maximum of 11% by weight LiCl would have the following parameters of operation for equivalent capacity: Diameter 24 inches, thickness 6 inches, rotation speed 3–4 minutes per revolution, at the same air flow and corrugation size above.

While the overall level of performance of the desiccant wheel also depends upon the process stream input, the performance of prior art systems typically deliver dried air on the input side of the desiccant wheel with an absolute humidity of 0.003 lb. water per lb. of air passing therethrough. For this level of humidity, a lithium chloride-asbestos wheel at reference conditions will require 0.99 air, have a relative energy value of 1.03, and will handle a dried air amount of 0.75. In contrast, the molecular sieves according the the present invention at the above regeneration of 500° F. will deliver dried air on the input side with a humidity of 0.0012 lb. of water per lb. of air, with a required air level on the order of only 0.79, and energy value of 0.92, and will handle 0.65 dried air. It can be seen that the air is dried to a greater depth, the improvement being on the order of 2½ times dryer, while at the same time lesser air is required at an energy savings on the order of over 10%. This leads to a major gain insofar as smaller machines may be constructed due to the capability of deeper drying.

In addition, we have found that we can regenerate at substantially higher temperatures in the presence of products of combustion without degradation or deterioration of drying ability when using the molecular sieve of the present invention. Whereas at low temperatures of regeneration, below about 250° F., a kraft paper support may be used, at higher temperatures we prefer to use the asbestos, fiberglass or high-temperature resistant polymeric material such as Teflon or Kel-F. The higher regeneration temperature also provides us with improved regeneration time and a reduction in total energy required. In addition, these materials permit a regeneration on the order of 500° F. which in turn provide for more nearly total reactivation of the molecular sieves thus leading to improvements in drying ability.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An improved low pressure drop, continuously regeneratable desiccant apparatus comprising a fibrous paper support material formed into a rotatable desiccant wheel having axially parallel apertures therethrough, said support material being selected from the group consisting of cellulosic fibers, glass fibers, asbestos, synthetic plastic fibers, and mixtures thereof, said support material containing a finely powdered crystalline zeolite desiccant in an amount ranging from about 1 to 90% by weight on a dry basis, means for passing air to be processed in one direction through said wheel, means for passing regenerative air through said wheel countercurrent to said air to be processed and heater means for heating a portion of said regeneration air, and means for passing a cooling stream through said desiccant wheel between said regeneration stream and the introduction of said process stream, said cooling stream passing cocurrent with said process stream and means for feeding said cooling stream into said regeneration stream between said heater and said desiccant wheel.

2. The apparatus of claim 1 having a heat exchanger between the dry product stream and the incoming regeneration stream.

3. The apparatus of claim 2 having means for dry air recycle before said heat exchanger recycling a portion of the dry product stream into the regeneration stream before said regeneration stream passes said heater.

4. An improved process for drying air by a continuous, atmospheric pressure and low pressure drop process comprising the steps:

continuously passing the air to be dried through an adsorbent body consisting essentially of thin sheets or layers of fibrous material containing about 10 to about 90% by weight of a finely divided crystalline molecular sieve material for a time sufficient to permit the molecular sieve material to adsorb moisture from said air to an acceptable moisture level and removing dry product air in a first phase; and regenerating said adsorbent body by continuously passing countercurrent to the drying stream through said adsorbent body in a second phase, a heated regeneration stream removing the moisture from said adsorbent body, exhausting the regeneration stream and continuously passing a cooling stream through said adsorbent body between said regeneration stream and the introduction of the process stream.

5. The process of claim 4 wherein said adsorbent body is a continuously rotating wheel.

6. The process of claim 4 wherein said molecular sieve material is an amount of about 25 to about 90% by weight.

7. The process of claim 4 wherein said dry product air is passed through a heat exchanger with the incoming regeneration stream heating said regeneration stream before it is passed through said heater.

8. The process of claim 4 wherein said heater is an open gas flame.

9. The process of claim 4 wherein it is desired to obtain dry product of less than 0.001 lb. moisture per pound of air, recycling a portion of said dry product stream to said regeneration stream prior to heating said regeneration stream.

* * * * *